(12) United States Patent
Hsiang et al.

(10) Patent No.: US 8,384,868 B2
(45) Date of Patent: Feb. 26, 2013

(54) LIQUID CRYSTAL DISPLAY PANEL

(75) Inventors: Rui-Jie Hsiang, Miao-Li County (TW);
Chih-Lung Lin, Miao-Li County (TW);
I-An Yao, Miao-Li County (TW);
Ying-Ling Chen, Miao-Li County (TW);
Chueh-Ju Chen, Miao-Li County (TW)

(73) Assignee: Chimei InnoLux Corporation, Chu-Nan, Miao-Li County (TW)

( * ) Notice: Subject to any disclaimer, the term of this patent is extended or adjusted under 35 U.S.C. 154(b) by 219 days.

(21) Appl. No.: 12/885,586

(22) Filed: Sep. 20, 2010

(65) Prior Publication Data

US 2011/0075084 A1  Mar. 31, 2011

(30) Foreign Application Priority Data

Sep. 25, 2009 (CN) .......................... 2009 1 0307710

(51) Int. Cl.
*G02F 1/1343* (2006.01)
*G02F 1/1337* (2006.01)
(52) U.S. Cl. .................... 349/141; 349/129; 349/139
(58) Field of Classification Search .................. 349/129, 349/147
See application file for complete search history.

(56) References Cited

U.S. PATENT DOCUMENTS

| 6,323,926 | B2 | 11/2001 | Watanabe et al. | |
|---|---|---|---|---|
| 7,646,463 | B2 * | 1/2010 | Chen et al. | 349/141 |
| 7,649,602 | B2 * | 1/2010 | Chen et al. | 349/129 |
| 8,077,269 | B2 * | 12/2011 | Kim et al. | 349/46 |
| 8,199,088 | B2 * | 6/2012 | You et al. | 345/87 |
| 2003/0071952 | A1 * | 4/2003 | Yoshida et al. | 349/141 |
| 2008/0007681 | A1 * | 1/2008 | Chen et al. | 349/129 |
| 2010/0060838 | A1 * | 3/2010 | Kim et al. | 349/141 |
| 2010/0085525 | A1 * | 4/2010 | Chen et al. | 349/141 |
| 2010/0110358 | A1 * | 5/2010 | Um et al. | 349/141 |
| 2010/0123845 | A1 * | 5/2010 | Kim et al. | 349/46 |
| 2010/0134742 | A1 * | 6/2010 | Kim et al. | 349/141 |

* cited by examiner

*Primary Examiner* — Rhonda Peaced
(74) *Attorney, Agent, or Firm* — Muncy, Geissler, Olds & Lowe, PLLC (57) ABSTRACT

A liquid crystal display panel includes a first substrate, a second substrate opposite to the first substrate, a plurality of scan lines, a plurality of data lines intersecting with the scan lines, a plurality of pixel areas defined by the scan lines and the data lines, and a plurality of electrodes. Each electrode is positioned in a corresponding pixel area. Each pixel area has an inner surface. The electrode includes a branch portion, a frame connected to the branch portion, and a plurality of first slits defined by the frame and the branch portion, away from the inner surface of the pixel area.

12 Claims, 13 Drawing Sheets

| image | dark state (1V) | white state (5V) |
|---|---|---|
| light transmittance ratio (Tr%) | 0.0049 | 21.69 |
| contrast ratio | | 4220 |

LIQUID CRYSTAL DISPLAY PANEL

BACKGROUND

1. Technical Field

The present disclosure relates to a liquid crystal panel.

2. Description of the Related Art

Figure 10:
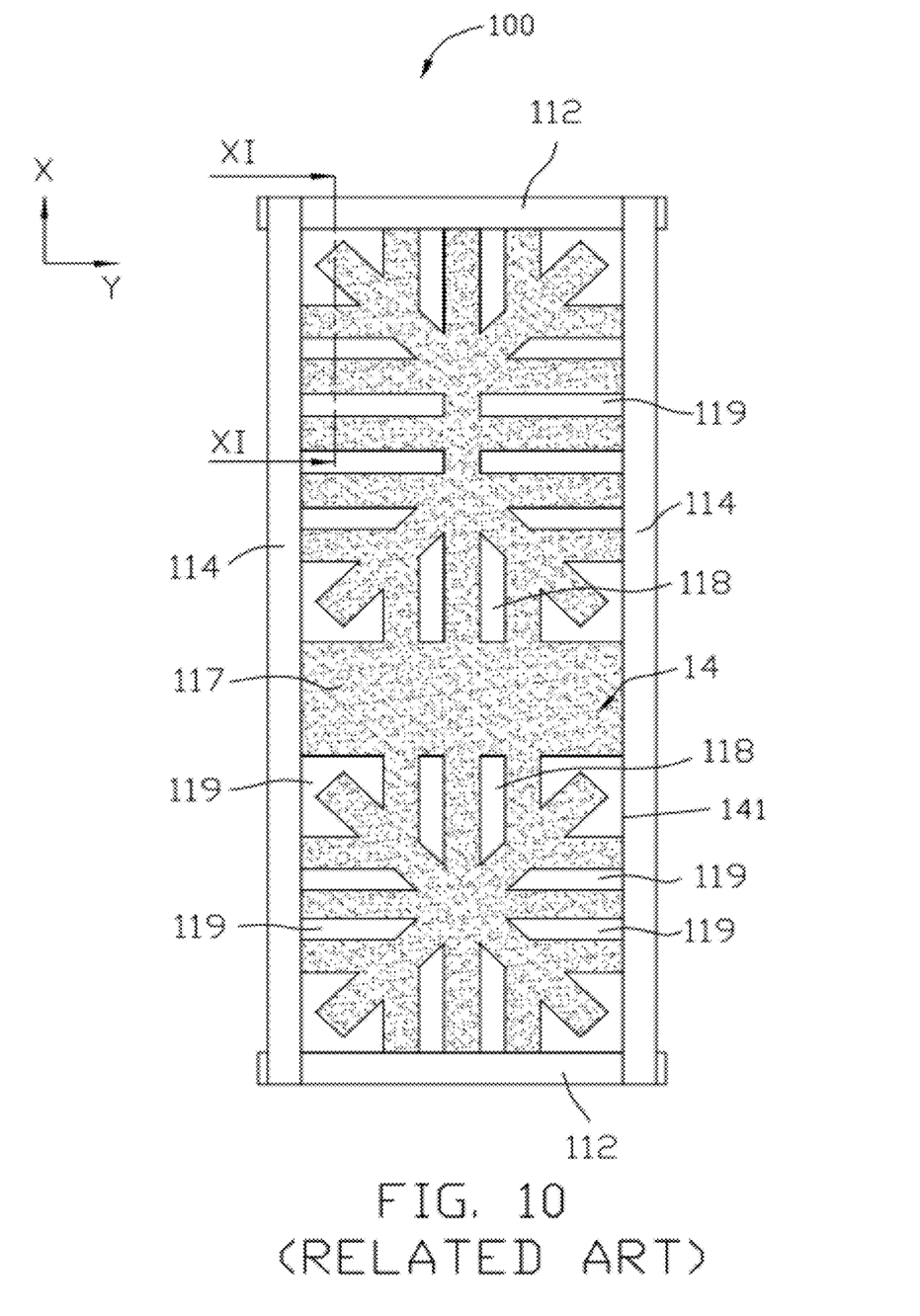
FIG. 10 is a top view of pixel area of a commonly used liquid crystal display panel.
Figure 11:
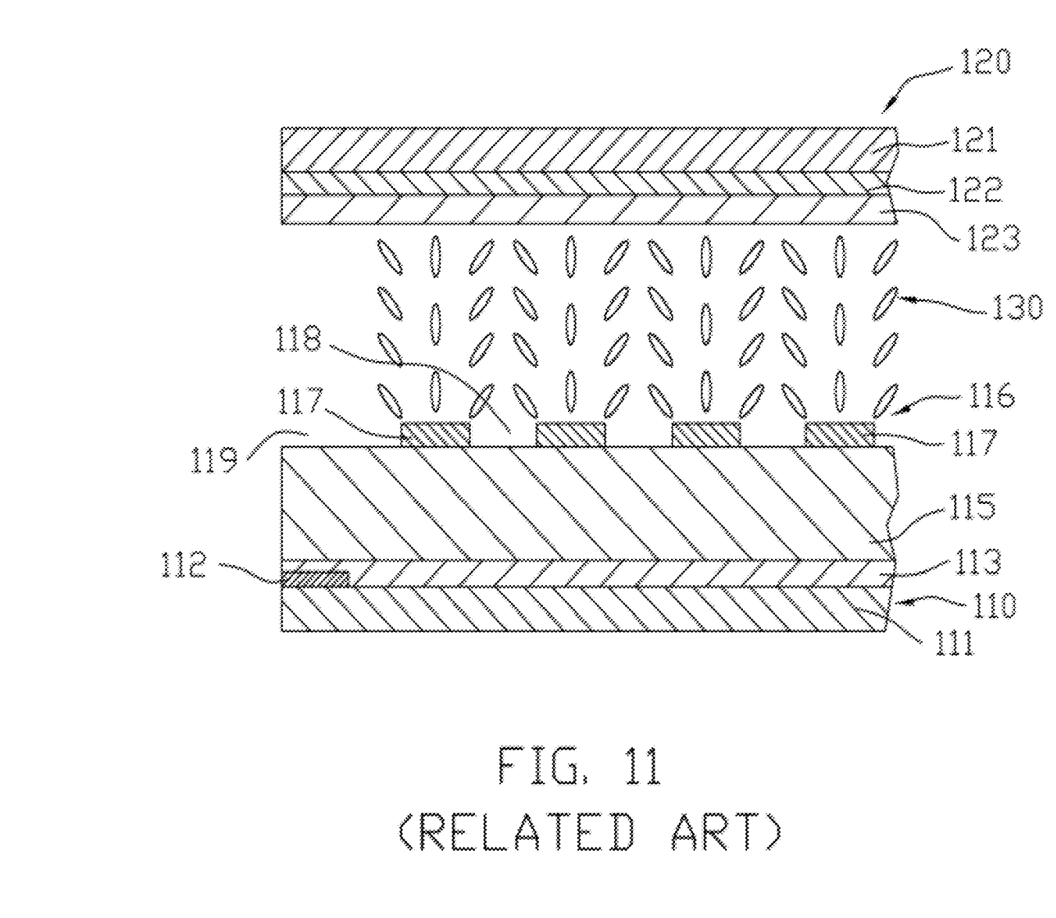
FIG. 11 is a cross-section of a portion of the liquid crystal display panel, taken along the line XI-XI.

Referring to FIGS. 10 and 11, a commonly used display panel 100 includes a first substrate 110, a second substrate 120, and a plurality of liquid crystal members 130. The first substrate 110 and the second substrate 120 are spaced from each other. The liquid crystal members 130 are positioned between the first substrate 110 and the second substrate 120. The first substrate 110 is a thin film transistor (TFT) array substrate. The second substrate 120 is a color filter substrate.

The first substrate 110 includes a first transparent base 111, a plurality of scan lines 112 extending along a Y axis, a first insulated layer 113, a plurality of data lines 114, a second insulated layer 115 and an pixel electrode unit 116 formed on the second insulated layer 115. The first insulated layer 113 is formed on the first transparent base 111. The scan line 112 is formed on the first transparent base 111 and adjacent to the first insulated layer 113. The data line 114 is formed on the first insulated layer 113, and extending along the X axis perpendicular to the Y axis. The pixel electrode unit 116 is connected to the liquid crystal members 13. A pair of adjacent scan lines 112 and a pair of adjacent data lines 114 cooperatively define a pixel area 14. The pixel area 14 has an inner surface 141. The pixel electrode unit 116 includes a plurality of electrodes 117 located in the pixel area 14. Each electrode 117 defines a first slit 118 away from the inner surface 141 of the pixel area 14, and a second slit 119 adjacent to the inner surface of the pixel area 14. The second substrate 120 includes a second transparent base 121, a second insulated layer 122 and a transparent electrode 123. The second insulated layer 122 is formed on the second transparent base 121. The transparent electrode 123 is formed on a surface of the second insulated layer 122 away from the second transparent base 121. Majority of liquid crystal members 130 are distributed such that a long axis of the liquid crystal member 130 extends perpendicularly to the first substrate 110 and the second substrate 120; minority of the liquid crystal members 130 adjacent to the first slit 118, the second slit 119 or the electrode 117 are distributed in a manner such that a long axis of the liquid crystal member 13 is oblique relative to the first substrate 11 and the second substrate 12 when no voltage is applied on the pixel electrode unit 116.

Figure 12:
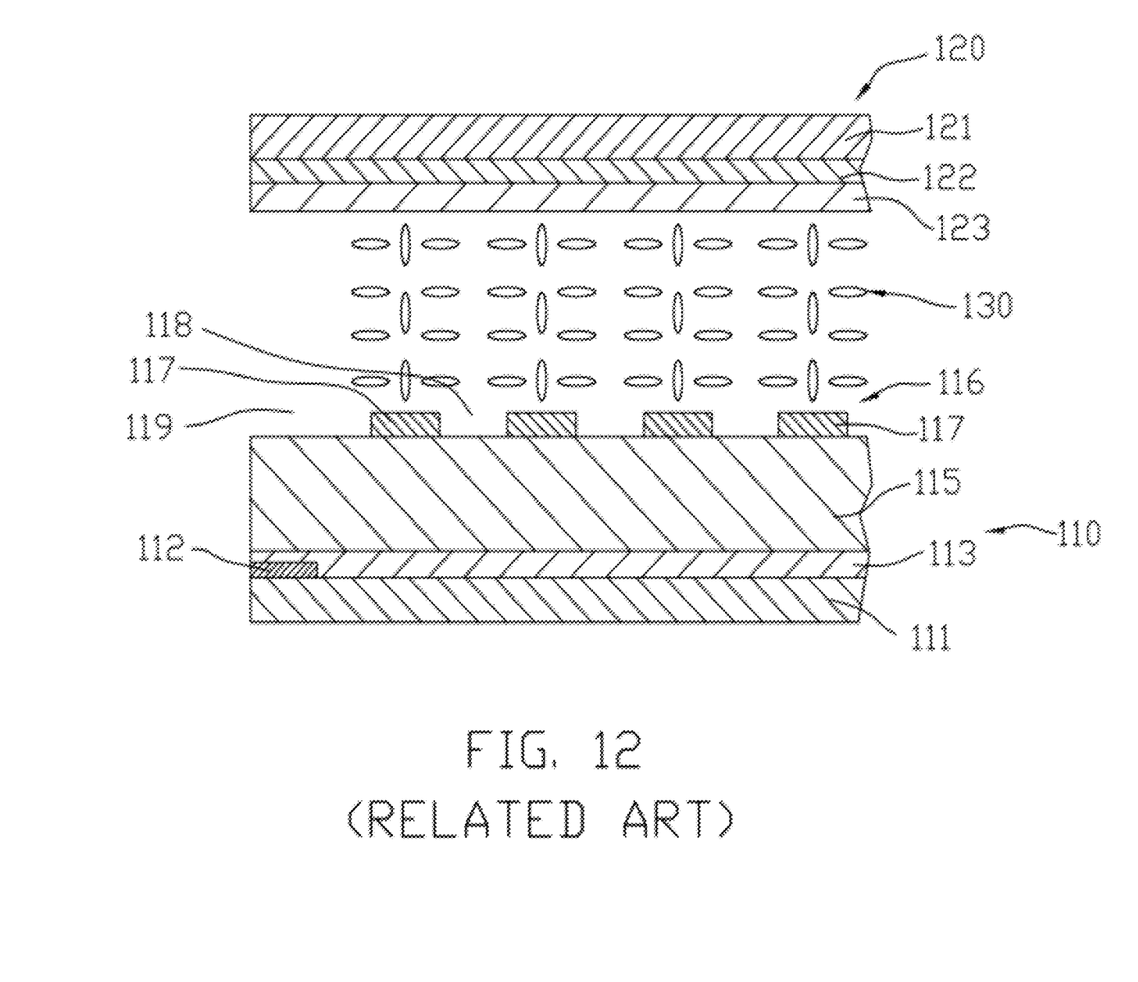
FIG. 12 is a cross-section of the liquid crystal display panel of FIG. 10 when a voltage is applied.

Referring to FIG. 12, when a voltage is applied on the pixel electrode unit 116, the scan lines 112 and the data lines 114 are scanned in the pixel area 14. An electrical field is formed between the electrode 117 and the transparent electrode 123. The electrical field alters the axis of the liquid crystal members 13, thus a color image is formed and displayed on the panel.

Lines of force of the electrical field extend from the electrode 117 to the transparent electrode 123 when a voltage is applied. However, an extra electrical field is also created by the scan lines 112 and the data lines 114 surrounding the electrode 117. The extra electrical field has a plurality of lines of force extending along axis different from those of the original electrical field. The liquid crystal members 13 adjacent to the scan lines 112 and the data lines 114 may be not distributed in a predetermined manner, resulting in light leakage from the liquid crystal panel 100.

Figure 13:
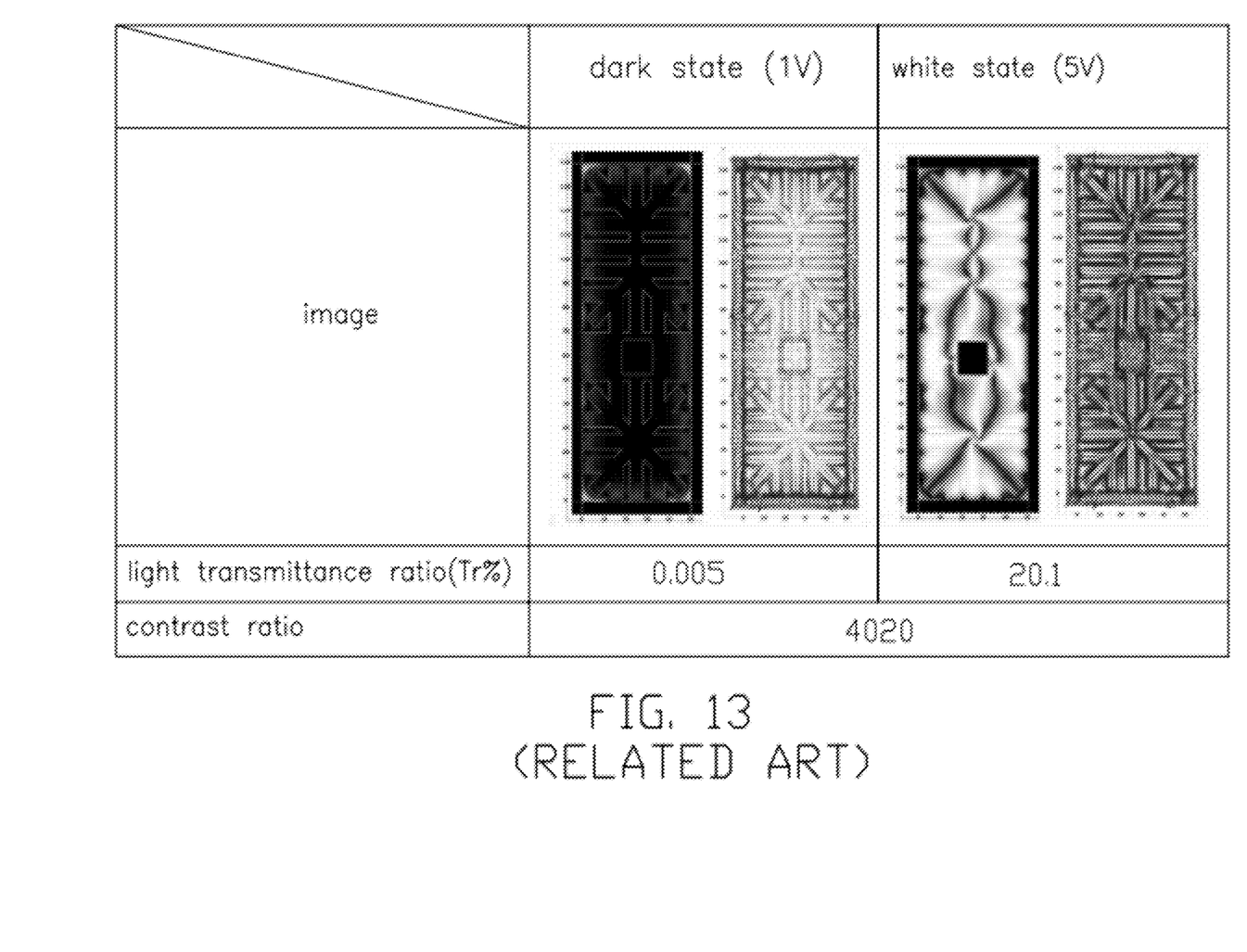
FIG. 13 shows photos of the commonly used liquid crystal display panel of FIG. 10.

Referring to FIG. 13, when the liquid crystal panel 100 works in a white state (applied vantage: 5V), the light transmittance is low because of the light leakage from the liquid crystal panel 100, resulting in a low contrast ratio.

Therefore, there is room for improvement within the art.

SUMMARY

An embodiment discloses a liquid crystal display panel including a first substrate, a second substrate opposite to the first substrate, a plurality of scan lines, a plurality of data lines intersecting with the scan lines, a plurality of pixel areas defined by the scan lines and the data lines, and a plurality of electrodes. Each electrode is positioned in each pixel areas. Each pixel area has an inner surface. The electrode includes a branch portion, a frame connected to the branch portion, and a plurality of first slits defined by the frame and the branch portion. The first slits are away from the inner surface of the pixel area.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views, and both the views are schematic.

DETAILED DESCRIPTION

Figure 1:
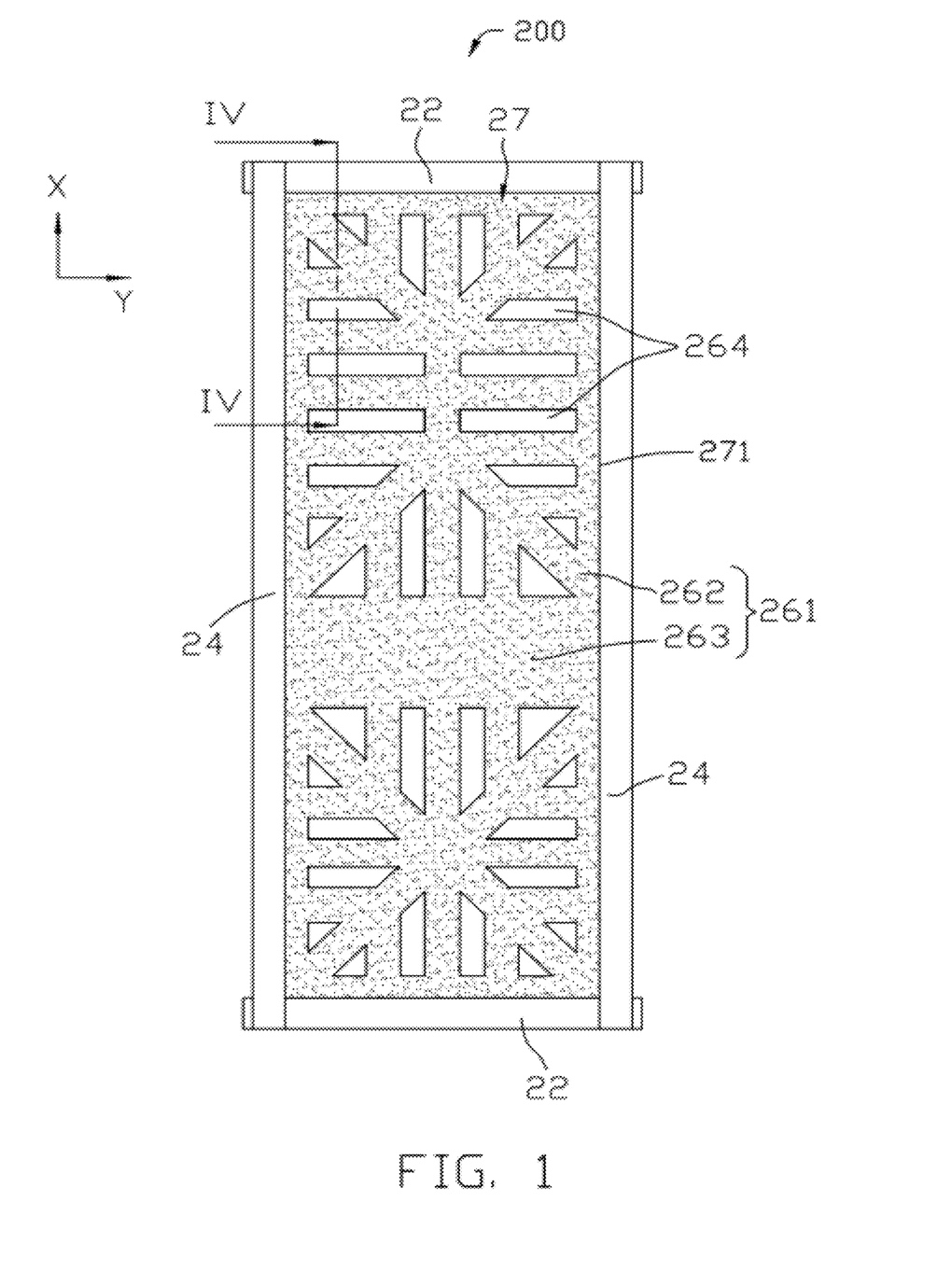
FIG. 1 is a top view of a pixel area of a first embodiment of a liquid crystal display panel, including an electrode.
Figure 2:
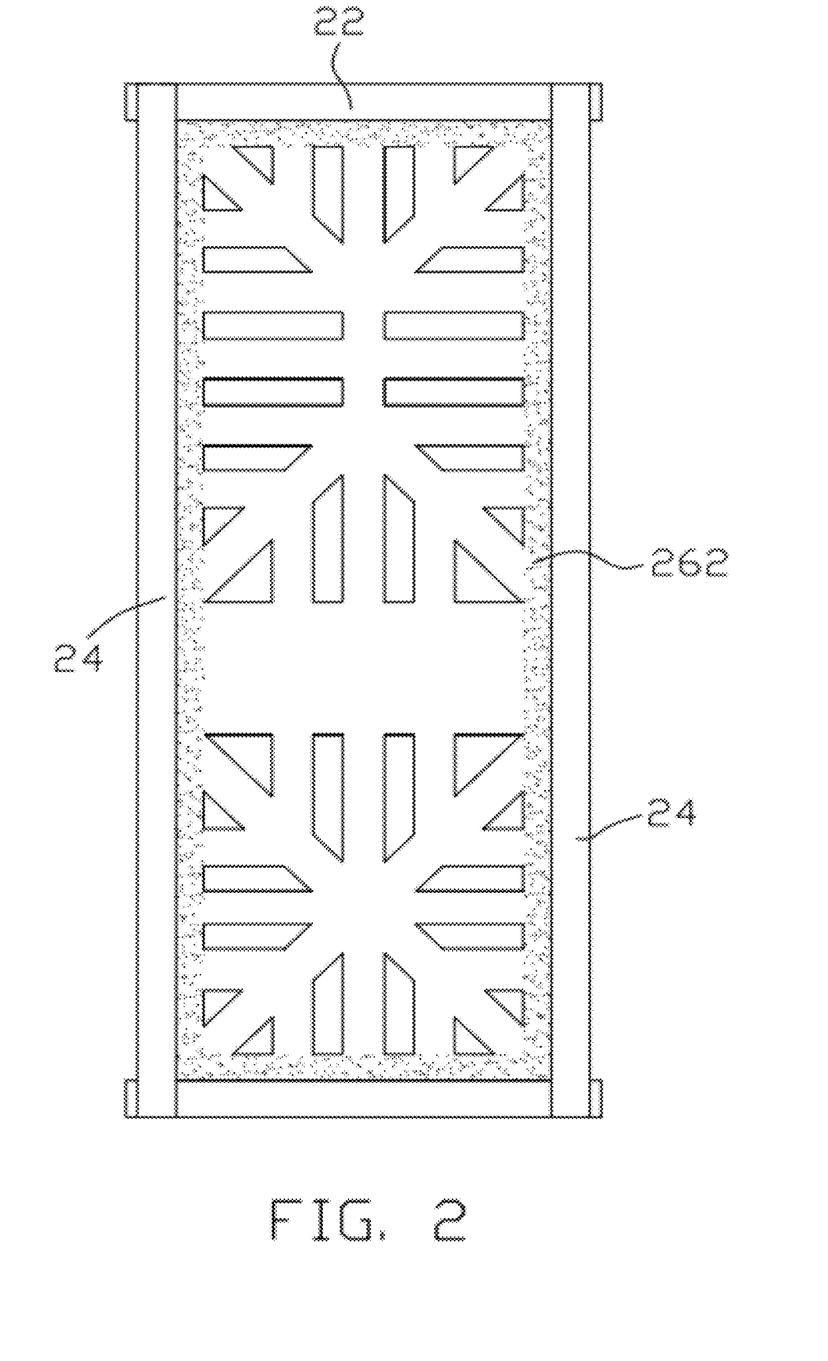
FIG. 2 is a partial view of the electrode of FIG. 1.
Figure 3:
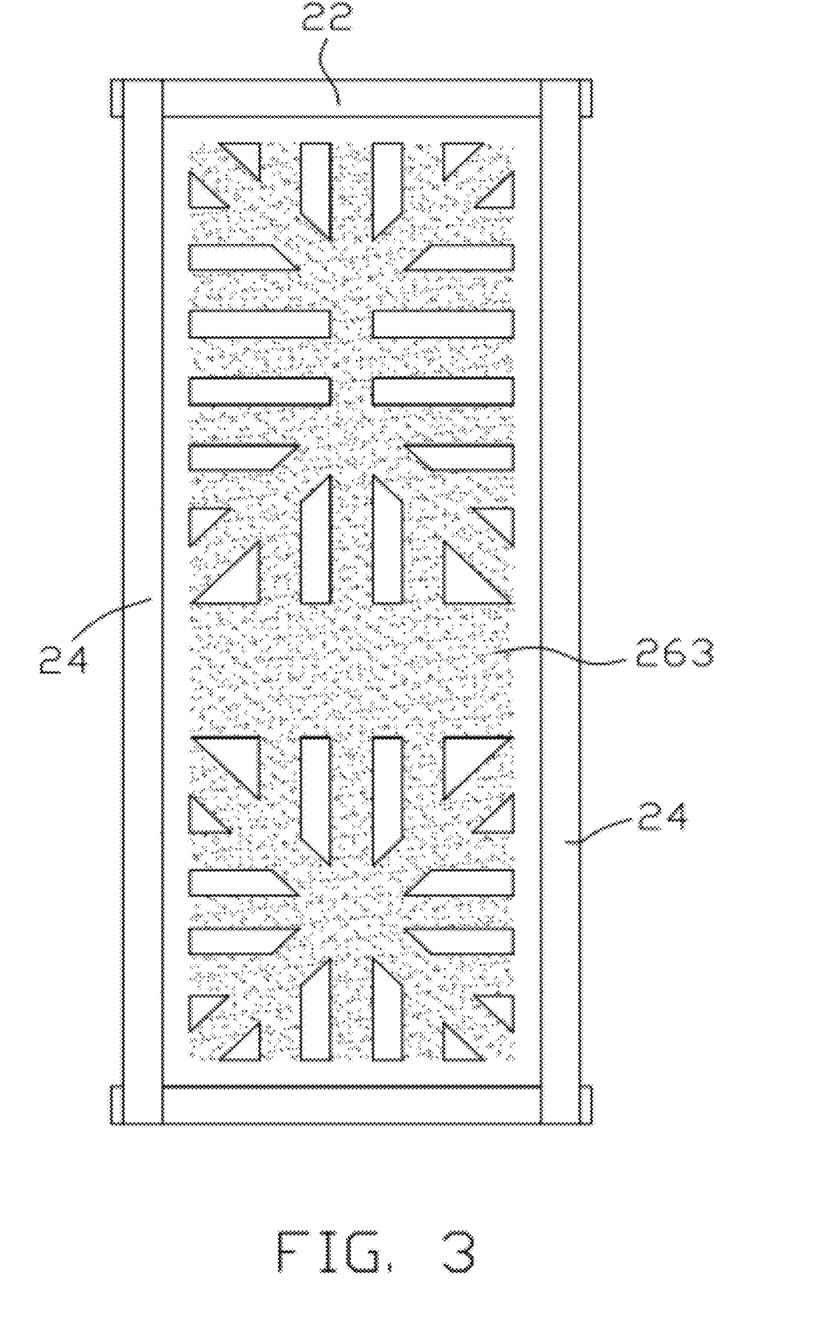
FIG. 3 is a partial view of the electrode of FIG. 1, from another aspect.
Figure 4:
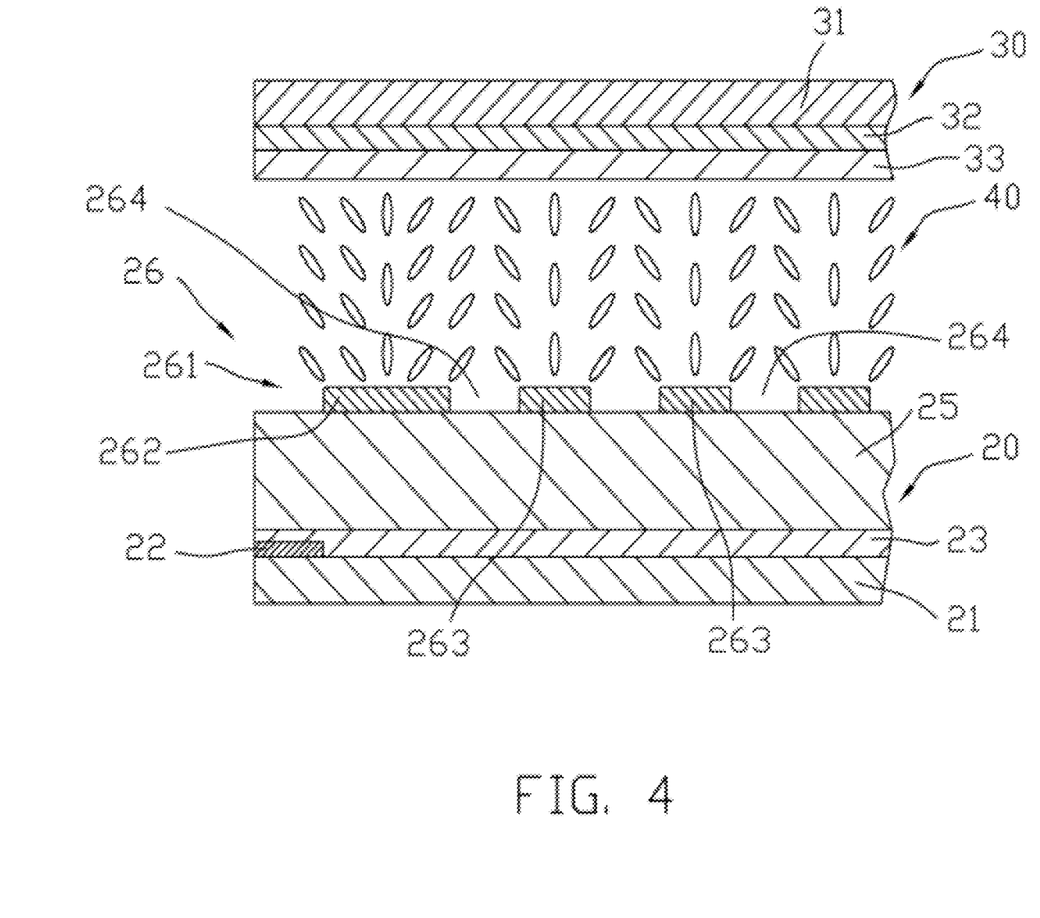
FIG. 4 is a cross-section of a portion of the liquid crystal display panel of FIG. 4, taken along the line II-II.

Referring to FIGS. 1 though 4, a liquid crystal display panel 200 includes a first substrate 20, a second substrate 30, and a plurality of liquid crystal members 40 positioned between the first substrate 20 and the second substrate 30. The first substrate 20 includes a first base 21, a plurality of scan lines 22 formed on the first base 21 extending along the Y axis, a first insulated layer 23, a plurality of data lines 24 extending along the X axis, a second insulated layer 25, and a pixel electrode unit 26. In the illustrated embodiment, the X axis is substantially perpendicular to the Y axis. The second insulated layer 25 and the data lines 24 are formed on the first insulated layer 23. The pixel electrode unit 26 is formed on the second insulated layer 25 and contacts the liquid crystal members 40. A pair of adjacent scan lines 22 and a pair of adjacent data lines 24 cooperatively define a rectangular pixel area 27 with a rectangular inner surface. The pixel area 27 has an inner surface 271 for receiving the pixel electrode unit 26.

The pixel electrode unit 26 includes a plurality of electrodes 261, each in a corresponding pixel area 27. The electrode 261 includes a rectangular frame 262, and a fishbone-shaped branch portion 263. An outer surface of the frame 262 contacts the inner surface 271 of the pixel area 27. The branch portion 263 is connected to the frame 262. The frame 262 and the branch portion 263 cooperatively define a polygonal first slit 264 therein. The projections of the frame 262 and the branch portion 263 define a closed grid. The second substrate 30 includes a second base 31, a transparent insulated layer 32, and an upper electrode 33. The insulated layer 32 is formed on a surface of the second base 31 adjacent to the liquid crystal members 40. The upper electrode 33 is formed on a surface of the insulated layer 32 away from the second base 31.

The liquid crystal members 40, of anisotropic liquid crystal materials with negative dielectric constant, are positioned between the first substrate 20 and the second substrate 30, facing the pixel area 27. Most of the liquid crystal members 40 are distributed in a manner whereby a long axis of the liquid crystal member 40 is substantially perpendicular to the first substrate 20 and the second substrate 30, and a minority of the liquid crystal members 40 adjacent to the first slit 264 and the electrode 261 are distributed such that a long axis of the liquid crystal member 13 is angled relative to the first substrate 20 and the second substrate 30 when no voltage is applied on the pixel electrode unit 26.

The scan lines 22 and the data lines 24 scan the pixel area 27, and create a signal voltage for controlling the TFT (not shown) when a voltage is applied. An electronic field is created between the electrode 261 and the upper electrode 33. The electronic field has force lines extending from the electrode 261 to the upper electrode 33. The electronic field is capable of driving the liquid crystal members 4 to rotate substantially perpendicular to the force lines, forming a color image on the liquid crystal display panel.

The electrode 261 includes several zones divided by the first slit 264, with each zone creating an electrical field accordingly. Thus, MVA (Multi-domain Vertical Alignment) may be performed in the liquid crystal panel 200. The frame 262 and the branch portion 263 define the first slit 264 therein, away from the inner surface 271 of the area 27, and the frame 262 separates the adjacent scan line 22 and the data line 24, to reduce influence of an extra electrical field created the by the scan lines 22 and the data lines 24. Thus, light leakage may be reduced or even eliminated, and a contrast of the liquid crystal panel 200 may be improved.

Figure 5:
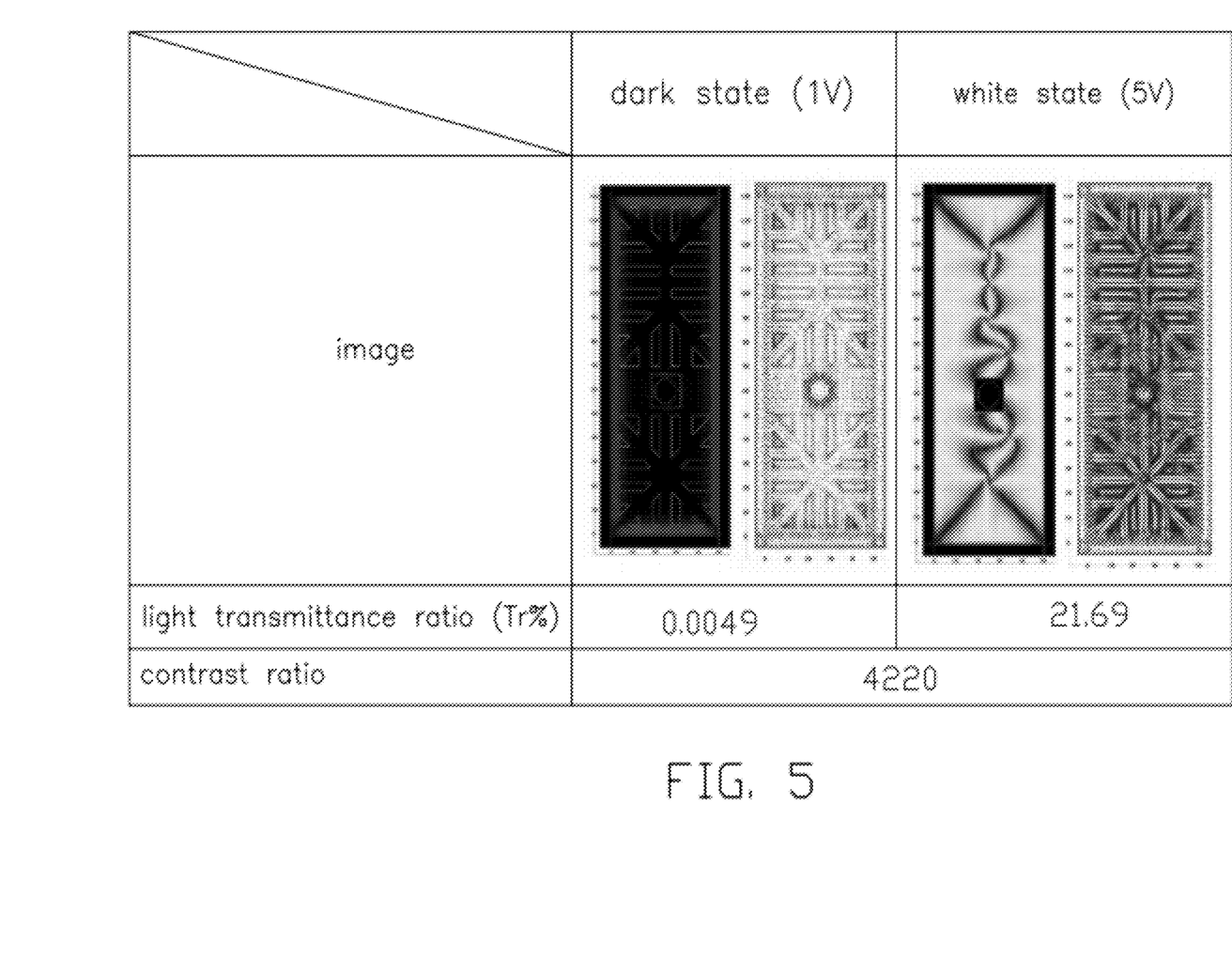
FIG. 5 shows photos of the liquid crystal display panel of FIG. 4.

Referring to FIG. 5, when the voltage applied is 1V, the liquid crystal panel 200 is in a dark state. Because the light leakage is reduced, the brightness of the liquid crystal panel 200 is improved. When the voltage applied is 5V, the liquid crystal panel 200 is in a white state, the liquid crystal members 40 are distributed in the same manner. Thus, the light transmittance and the contrast ratio of the liquid crystal panel 200 may be improved.

Referring to FIGS. 6 through 9, a second embodiment of the liquid display panel 500 includes a pixel area 57 and a pixel electrode unit 56. The pixel electrode unit 56 includes a plurality of electrodes 561. Each electrode 561 includes a frame 562 and a branch portion 563. The branch portion 563 includes a central segment 566 extending along the X axis and an extending segment 567 symmetrically extending from the central segment 566 toward the outside and connecting to the frame 562. The frame 562, the central segment 566, and the extending segment 567 cooperatively define a plurality of first slits 564. The electrode 561 further defines a plurality of second slits 565 extending through an edge of the frame 562. The second slits 565 are symmetrically disposed at both sides of the branch portion 563. The second slit 565 has an opening 568 adjacent to the inner surface 571 of the pixel area 57. In the illustrated embodiment, a length of projection along the X axis of the opening 568 of the second slit 565 on the pixel area 57 is equal to or less than 40% of that of the inner surface 571 of the pixel area 57. Each second slit 564 is disposed between two adjacent first slits 564. Thus, an angled electronic field created by the frame 562 exerts less influence on the liquid crystal members 70, and dark lines on the liquid crystal display may be prevented.

It is understood that the second slit 565 may be defined between two adjacent first slits 564. A size of the pixel electrode 561 may be enlarged if desired. An edge electrical field created by the pixel electrode 561 is reduced by the second slit 565. Thus, the liquid crystal members 70 normalize and dark lines created by the edge electrical field may be reduced or eliminated. Alternatively, when used in a large display device, the size of each pixel electrode 561 and the length of each first slit 564 are increased. An angled electrical field is created by the frame 562 and the central segment 566, and the crystal members 70 adjacent to the frame 562 or the central segment 566 may experience unexpected distribution, disturbing other crystal members 70. The second slits 565 may be defined and symmetrically disposed between these first slits 564 to reduce the angled electrical field. Thus, the dark lines created by the angled electrical field are reduced.

The second substrate 60 includes a second transparent base 61, a transparent insulated layer 62, and a transparent upper electrode 63 formed on one surface of the second transparent base 61 in sequence. The surface of the second transparent base 61 is adjacent to the crystal members 70.

The crystal members 70 are positioned in a projecting area of the pixel area 57. The crystal members 70 may be anisotropic material with a negative dielectric constant. A majority of the crystal members is distributed between the first substrate 50 and the second substrate 60 such that the long axis of the crystal members 70 is substantially perpendicular to the first and the second substrates 50, 60. The crystal members 70 adjacent to the first slit 564, the second slit 565 and an edge of the pixel electrode 561 are distributed such that the long axis thereof is angled relative to the first substrate 50 and the second substrate 60.

Figure 6:
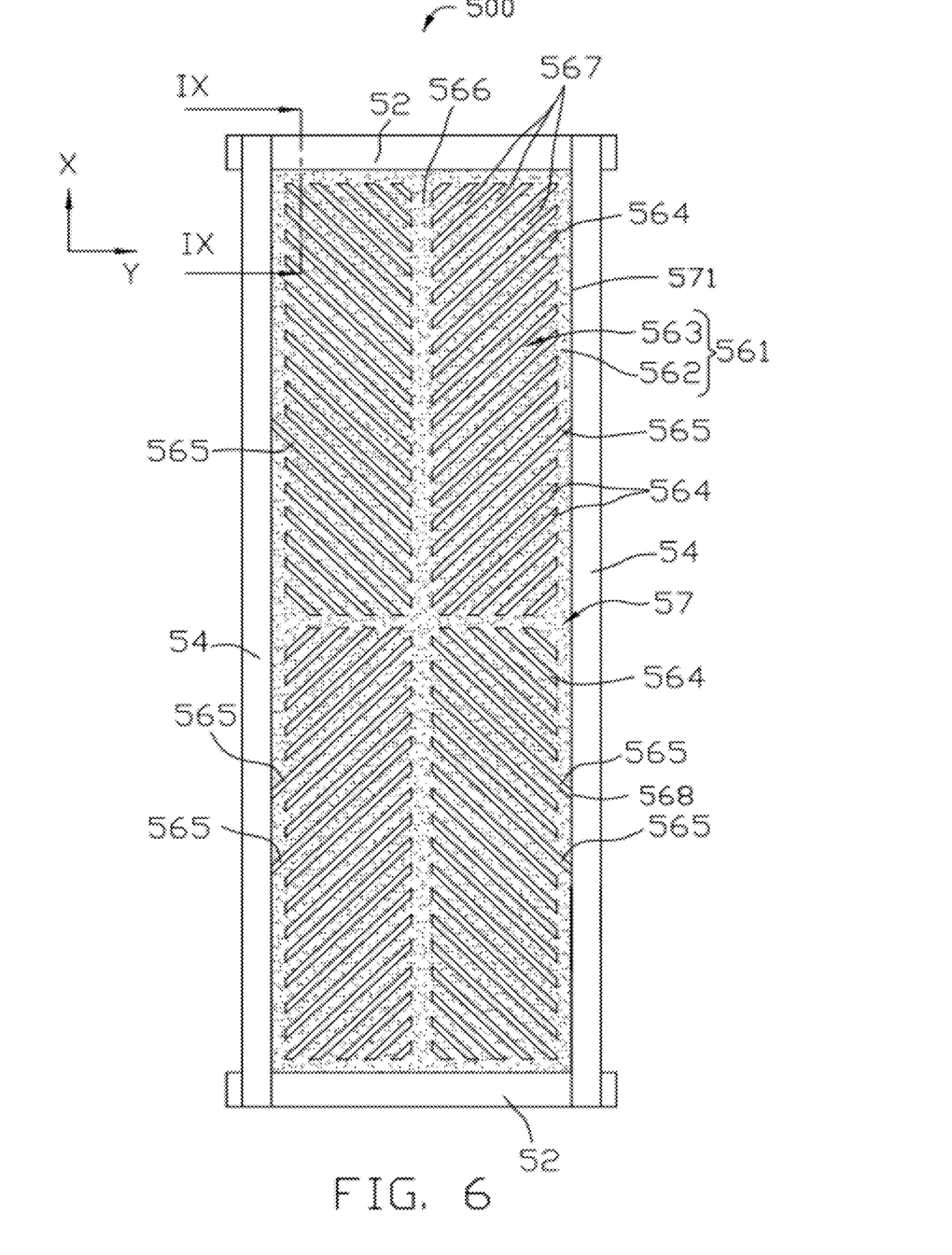
FIG. 6 is a top view of a pixel area of a second embodiment of a liquid crystal display panel, the liquid crystal display panel including an electrode.
Figure 7:
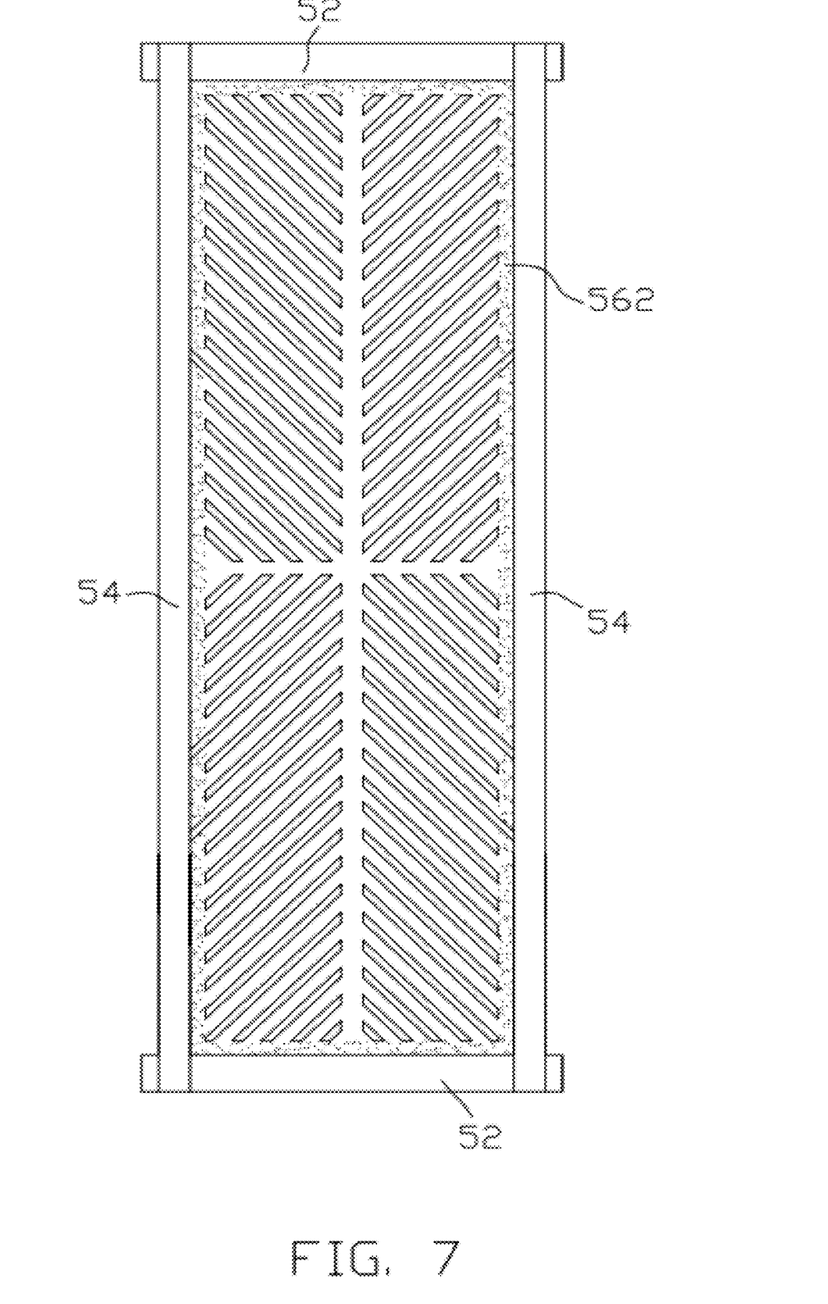
FIG. 7 is a top view of the electrode of FIG. 6.
Figure 8:
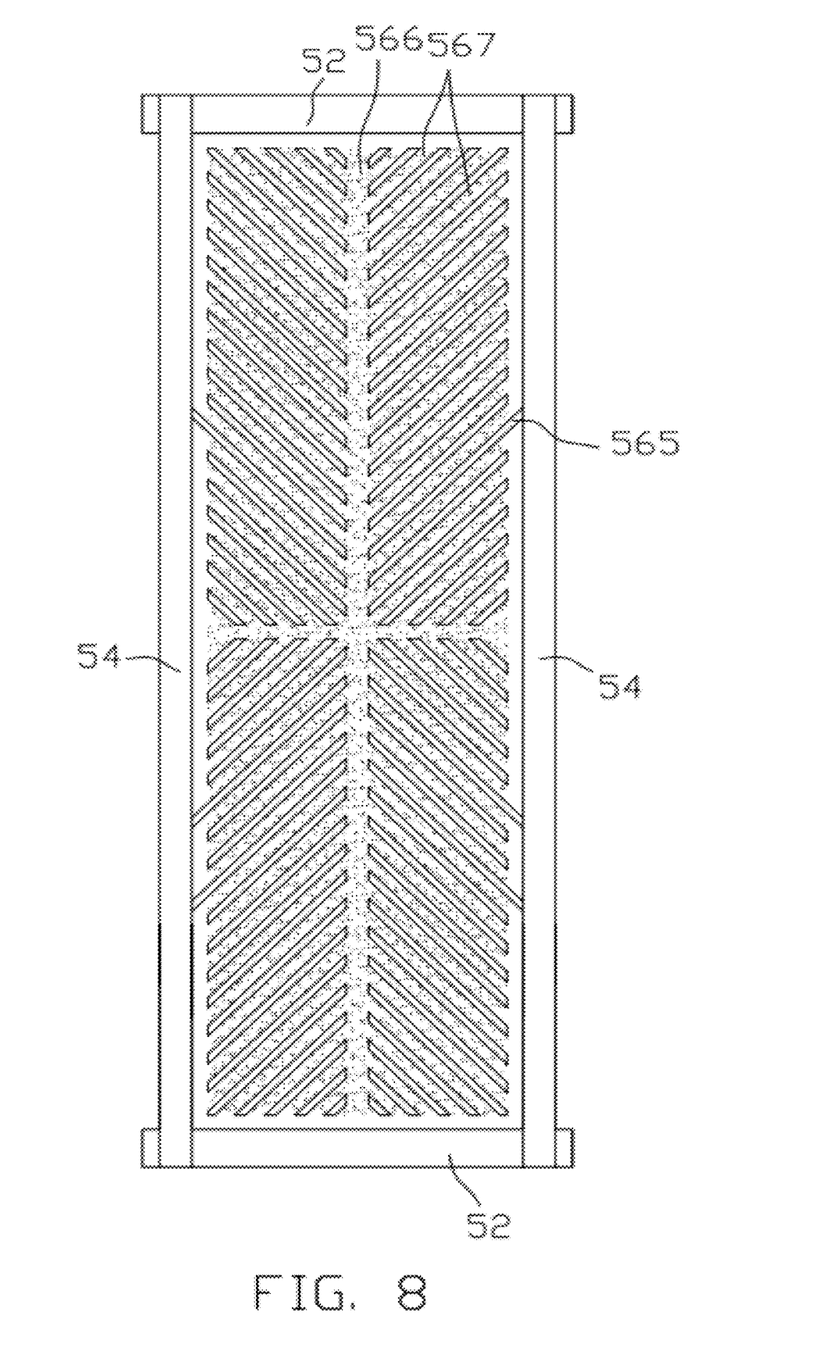
FIG. 8 is a top view of the electrode of FIG. 6, from another aspect.
Figure 9:
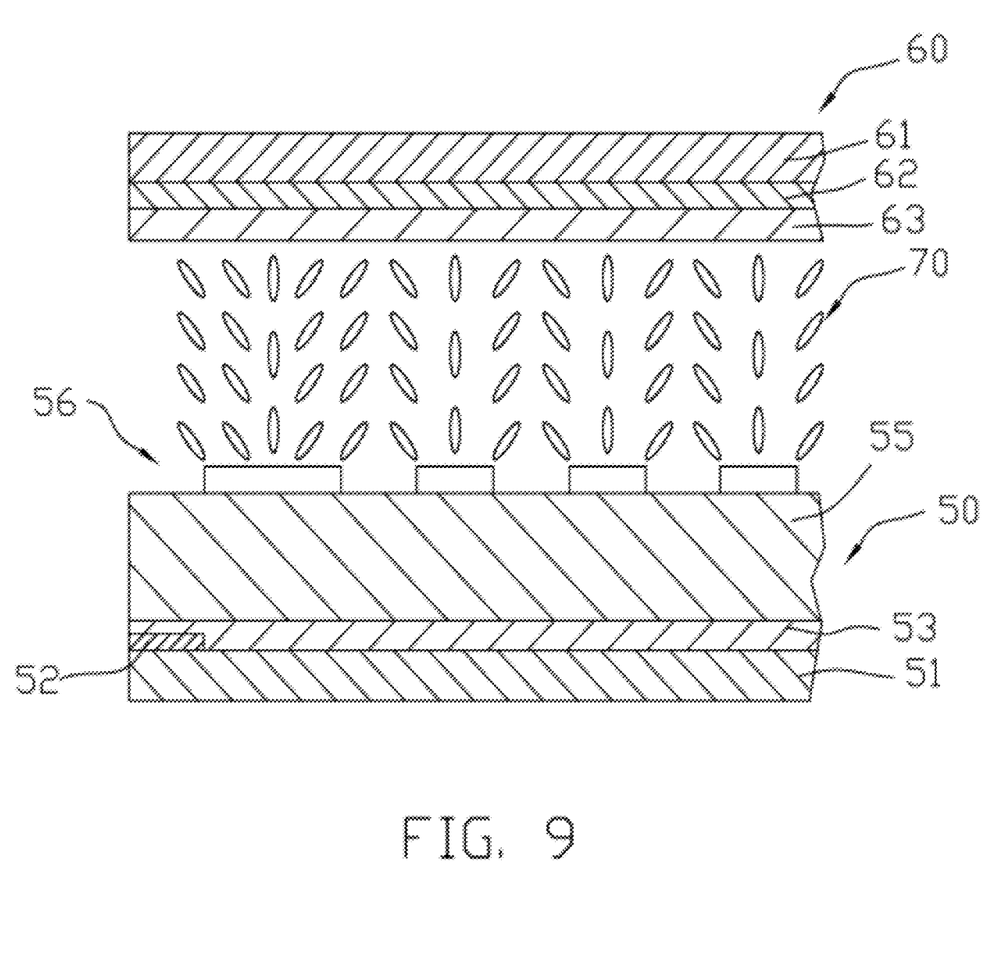
FIG. 9 is a cross-section of a portion of the electrode of FIG. 6, taken along the line IX-IX.

The first slit 264, 564 defined in the electrode 261, 561 is defined by the frame 262, 562 and the branch portion 263, 563, to insulate the adjacent scan lines 22, 52 and data lines 24, 54. Thus, the extra electrical field created by the adjacent data lines 24, 54 and scan lines 22, 52 exerts less influence on the liquid crystal members 40, 70, and light leakage of the liquid crystal panel 200, 500 and dark lines on the liquid crystal panel 200, 500 can be reduced or eliminated during use.

Finally, while particular embodiments have been described, the description is illustrative and is not to be construed as limiting. For example, various modifications can be made to the embodiments by those of ordinary skill in the art without departing from the true spirit and scope of the invention as defined by the appended claims.

What is claimed is:
1. A liquid crystal display panel, comprising:
a first substrate;
a second substrate opposite to the first substrate;
a plurality of scan lines;
a plurality of data lines intersecting with the scan lines;

a plurality of pixel areas each having a boundary defined by two adjacent ones of the scan lines and two adjacent ones of the data lines, ; and a plurality of electrodes, wherein each electrode is positioned in a corresponding pixel area and comprises:

a branch portion;

a frame connected to the branch portion;

a plurality of first slits defined by the frame and the branch portion, wherein each of the first slits has a closed end adjacent to the boundary, the frame being disposed between the boundary and the closed ends of the first slits; and a plurality of second slits defined by the frame and the branch portion and each extending through the frame to the boundary, at least one of the second slits being disposed between two adjacent ones of the first slits that extend substantially parallel to each other.

2. The liquid crystal display panel of claim 1, wherein the branch portion comprises a central segment extending along a first axis and an extending segment symmetrically extending from the central segment toward the outside and connecting to the frame.

3. The liquid crystal display panel of claim 2, wherein the branch portion is substantially fishbone-shaped.

4. The liquid crystal display panel of claim 2, wherein the frame is substantially rectangular.

5. The liquid crystal display panel of claim 2, wherein each first slit is substantially polygonal.

6. The liquid crystal display panel of claim 1, wherein the second slits are symmetrically defined on both sides of the branch portion.

7. The liquid crystal display panel of claim 1, wherein each of the second slits has an opening in proximity to the boundary, and a length of projection of the opening of each of the second slits on the pixel area equals or is less than 40% of that of the boundary of the pixel area.

8. A liquid crystal display panel comprising:

a first substrate;

a second substrate opposite to the first substrate;

a plurality of scan lines;

a plurality of data lines intersecting with the scan lines;

a plurality of pixel areas each having a boundary defined by two adjacent ones of the scan lines and two adjacent ones of the data lines; and a plurality of electrodes, wherein each electrode is positioned in a corresponding pixel area and comprises:

a branch portion;

a frame connected to the branch portion;

a plurality of first slits defined by the frame and the branch portion, wherein each of the first slits has a closed end adjacent to the boundary, the frame being disposed between the boundary and the closed ends of the first slits; and a plurality of second slits defined by the frame and the branch portion, wherein the second slits extend through an cdgc of the frame to the boundary, and only one of the second slits is disposed between at least an adjacent pair of the first slits.

9. The liquid crystal display panel of claim 8, wherein the branch portion comprises a central segment extending along a first axis and an extending segment symmetrically extending from the central segment toward the outside and connecting to the frame.

10. The liquid crystal display panel of claim 8, wherein the second slits are symmetrically disposed at both sides of the branch portion.

11. The liquid crystal display panel of claim 8, wherein the frame is substantially rectangular.

12. The liquid crystal display panel of claim 8, wherein each first slit is substantially polygonal.

* * * * *